April 6, 1948.  R. G. LE TOURNEAU  2,439,139

POWER SCOOP

Filed Sept. 3, 1946  3 Sheets-Sheet 3

INVENTOR
R. G. LeTourneau
BY
ATTORNEYS

Patented Apr. 6, 1948

2,439,139

UNITED STATES PATENT OFFICE 2,439,139

POWER SCOOP

Robert G. Le Tourneau, Peoria, Ill., assignor to R. G. Le Tourneau, Inc., Stockton, Calif., a corporation of California Application September 3, 1946, Serial No. 694,479

11 Claims. (Cl. 214—120)

This invention is directed to, and it is an object to provide, an improved power scoop for the purpose of digging and loading earth or other material; the implement having a relatively great reach, substantial capacity, and advantageous maneuverability.

Another object of the invention is to provide a power scoop which includes, in novel assembly, a wheel supported elevator frame having a power actuated carriage movable up and down the same, and an outwardly projecting scoop mounted on the carriage for travel therewith.

A further object of the invention is to provide a rotary scoop on the carriage; the scoop being of substantially semi-cylindrical configuration and mounted for rotation, about a transverse horizontal axis, between digging, carrying, and dumping positions.

An additional object is to provide novel power actuating means on the carriage for the rotation of the bowl between digging, carrying and dumping positions, selectively.

A further object of the invention is to mount the elevator frame for controlled outward tilting motion in a longitudinal vertical plane so as to vary the reach of the scoop; the supporting wheels adjacent the tiltable elevator frame being positioned relative to the axis of tilting of the latter so that said wheels move in a direction opposite the direction of outward tilt to then provide greater clearance below the scoop.

A further object of the invention is to produce a practical device and one which will be exceedingly effective for the purpose for which it is designed.

These objects are accomplished by means of such structure and relative arrangement of parts as willfully appear by a perusal of the following specification and claims.

Figure 1:
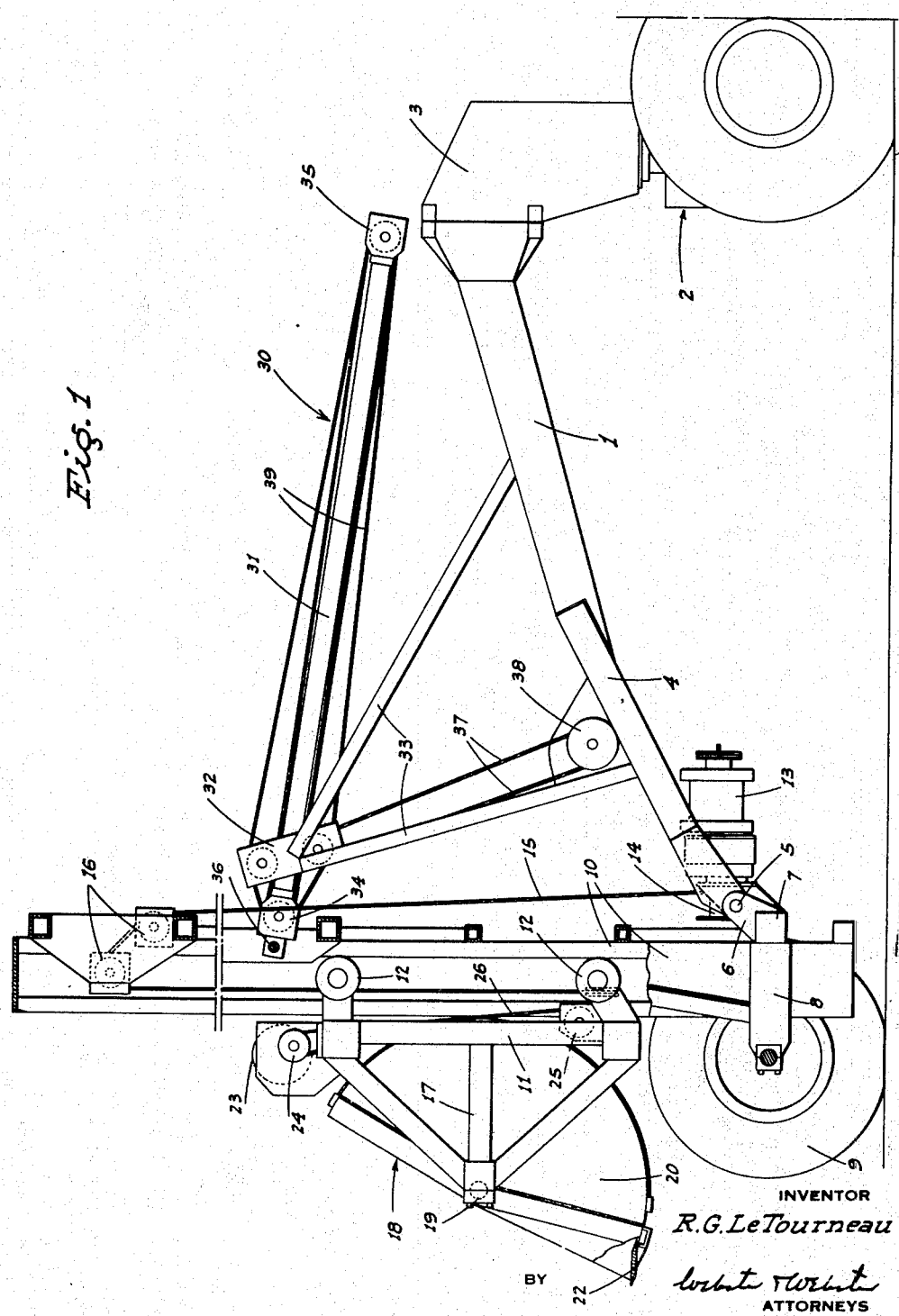
Figure 1 is a side elevation, partly in section, showing the power scoop as in use; the elevator frame being in its vertical position.

Referring now more particularly to the characters of reference on the drawings, the implement comprises a rigid longitudinally extending body 1 connected at its forward end to a tractor 2 by a coupling and power steering unit indicated generally at 3. At its rear end the longitudinal body 1 is forked, as at 4, and the fork is pivotally connected at its rear ends, as at 5, to attachment ears 6 which upstand in transversely spaced relation from the front of a wheel truck 7, which is generally U-shaped in plan, and which truck includes rearwardly projecting legs 8 which carry spindle mounted wheels 9. By this arrangement it will be noted that the axis of the pivots 5 is disposed in substantial offset relation ahead of the axis of the wheels 9 for the purpose hereinafter described.

An upstanding elevator frame 10 of substantial height is fixed at its lower end in connection with the truck 7 centrally between the wheels 9, and an elevator carriage 11 is roller supported in the elevator frame 10 for up and down movement. The supporting rollers for the elevator carriage 11 are shown at 12. The elevator carriage 11 is power actuated to raise and lower said carriage selectively by means of the following arrangement:

A reversible electric winch unit 13 is fixed on the truck 7 between the fork 4; said winch unit including a cable drum 14. A cable 15 leads from the drum 14 upwardly over direction changing sheaves 16 in the elevator frame adjacent the top thereof. From the sheaves 16 the cable 15 depends to connection with the elevator carriage 11, and, if desired, for the purpose of greater actuating power, said depending portion of the cable may be reeved in the form of a block and tackle system.

By operation of the electric winch unit 13 in one direction or the other, the cable 15 is caused to raise or lower the carriage 11 relative to the elevator frame 10.

The carriage 11, at opposite ends thereof, is fitted with brackets 17 which project outwardly lengthwise of the implement and a rotary scoop 18 extends between said brackets and is supported thereby by means of ball and socket units 19. The rotary scoop 18 is thus mounted on the carriage, in outwardly projecting relation, for rotation about a transverse horizontal axis.

The rotary scoop 18 is of substantially semi-cylindrical configuration and includes end plates 20 and an arcuate back wall 21 of circumferential extent approximating 180 degrees. At its normally lowermost edge of the rotary scoop 18 is provided with a transverse digging blade 22.

Figure 4:
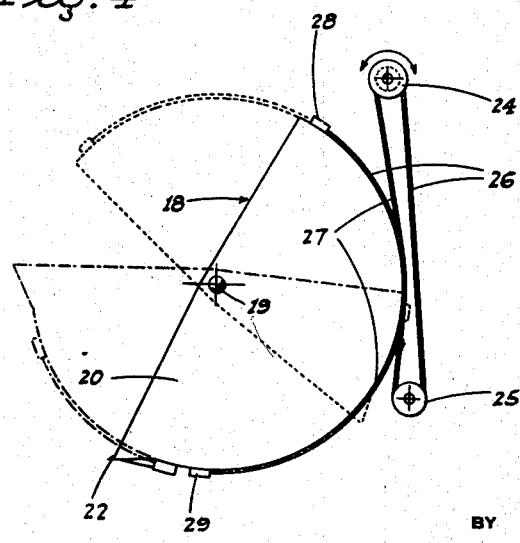
Figure 4 is a diagrammatic end elevation of the scoop and its cable actuating system.

Through the control of an actuating cable system, hereinafter described, the rotary scoop 18 is movable, at the selection of the operator, between digging position, as in full lines, carrying position, as in broken lines, and dumping position, as in dotted lines; all as shown in Fig. 4.

Said actuating cable system comprises a reversible electric winch unit 23 mounted on the upper end of the carriage and including a cable drum 24; said drum being disposed above the scoop and in substantial vertical alinement with a direction changing sheave 25 mounted in the carriage below the scoop axis. The drum 24 and direction changing sheave 25 are alined in a plane substantially tangential to the back wall 21 of said scoop. A cable is reversibly wound about the drum 24 and includes cable reaches 26 and 27 which extends from opposite sides of said drum. The cable reach 26 extends to and about the direction changing sheave 25 and thence extends upwardly where both reaches 26 and 27 engage in reverse, lapping relation about the back wall 21. At their ends the cable reaches 26 and 27 are anchored, as at 28 and 29, respectively, to the back wall 21 at relatively widely spaced points circumferentially thereof.

With rotation of the drum 24 in one direction or the other, the scoop 18 is caused to move between its respective positions, either clockwise or counter-clockwise, at the selection of the operator of the implement, which operator controls the reversible electric winch unit 23.

The upstanding elevator frame 10 is tiltable rearwardly lengthwise of the implement by reason of the pivotal connections 5 of the truck 7 with the body 1, and such tilting of the elevator frame 10 is accomplished through the medium of a tilt control unit, indicated generally at 30; this unit comprising the following:

A tilt control beam 31 runs in guided relation through a central sheave block 32 on the upper end of a post assembly 33 carried by the body 1. The beam 31 is fitted with end sheave blocks 34 and 35, respectively, and the sheave block 34 is pivotally connected to the elevator frame, intermediate its ends, as at 36. Cable reaches 37 are reversible wound in connection with a reversible electric winch unit 38 mounted on the body 1 and said cable reaches thence extend upwardly through the central sheave block 32, and are reeved between said sheave block and corresponding ones of the end sheave blocks 34 and 35 as opposed block and tackle systems 39. In other words, one of the cable reaches 37 is reeved between the central sheave block 32 and the end sheave block 34 as one block and tackle system while the other cable reach 37 is reeved as an opposed block and tackle system extending between the central sheave block 32 and the end sheave block 35. Upon operation of the winch unit 38 in one direction or the other, one block and tackle system 39 lengthens and the other shortens, and in this manner effective tilting control of the elevator frame 10 is accomplished. The tilt control unit, as is indicated generally at 30, is the subject of copending application, Serial No. 694,480, filed September 3, 1946.

The reversible electric winch units 13, 23 and 38 are interposed in an electric control circuit (not shown), but which includes control switches accessible to the operator of the tractor 2; such circuit being energized from a generator on said tractor. The identified winch units each includes a normally set brake which releases, automatically, when the corresponding winch unit is energized.

Figure 2:
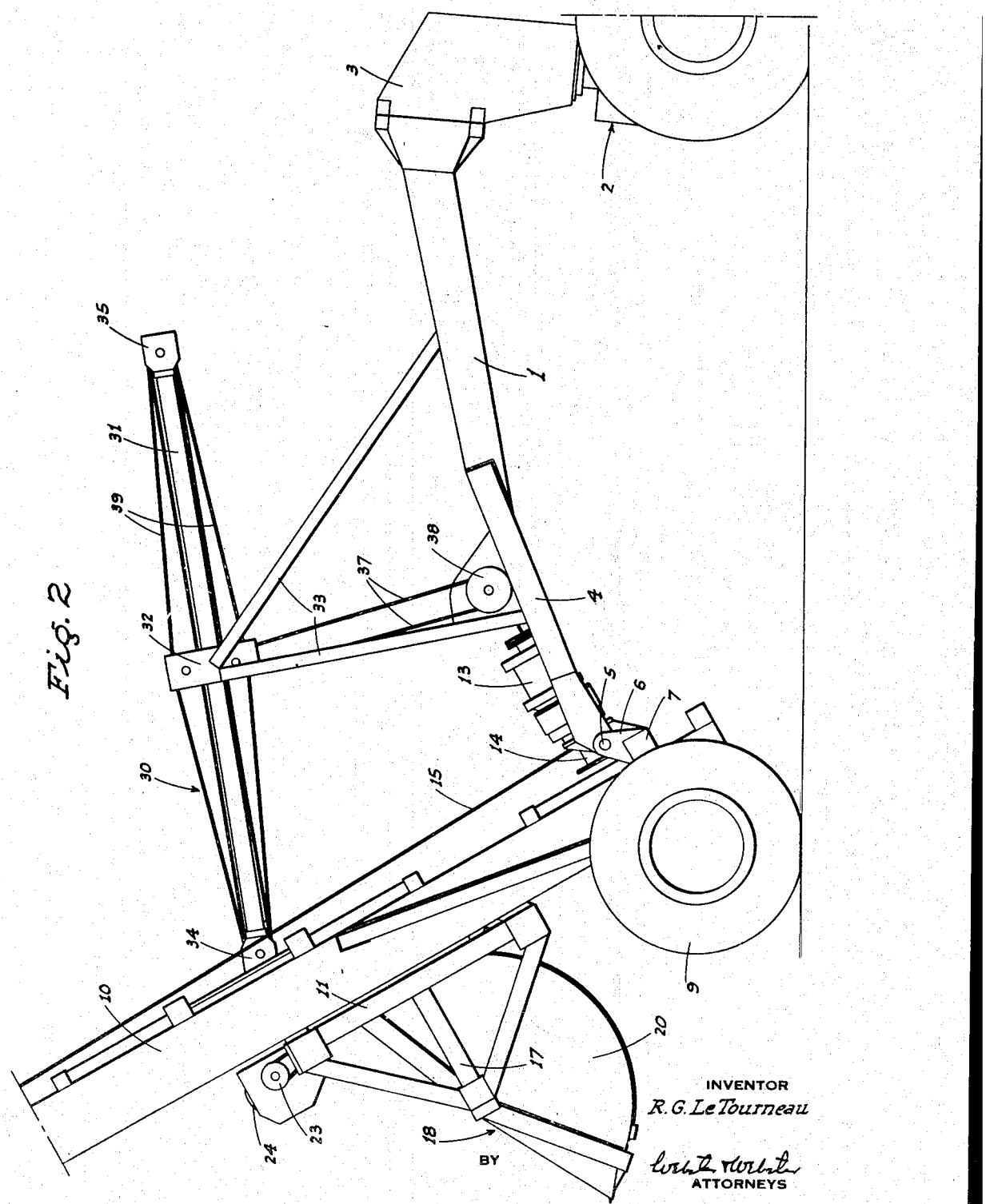
Figure 2 is a similar view but shows the elevator frame as tilted outwardly to increase the reach of the scoop.
Figure 3:
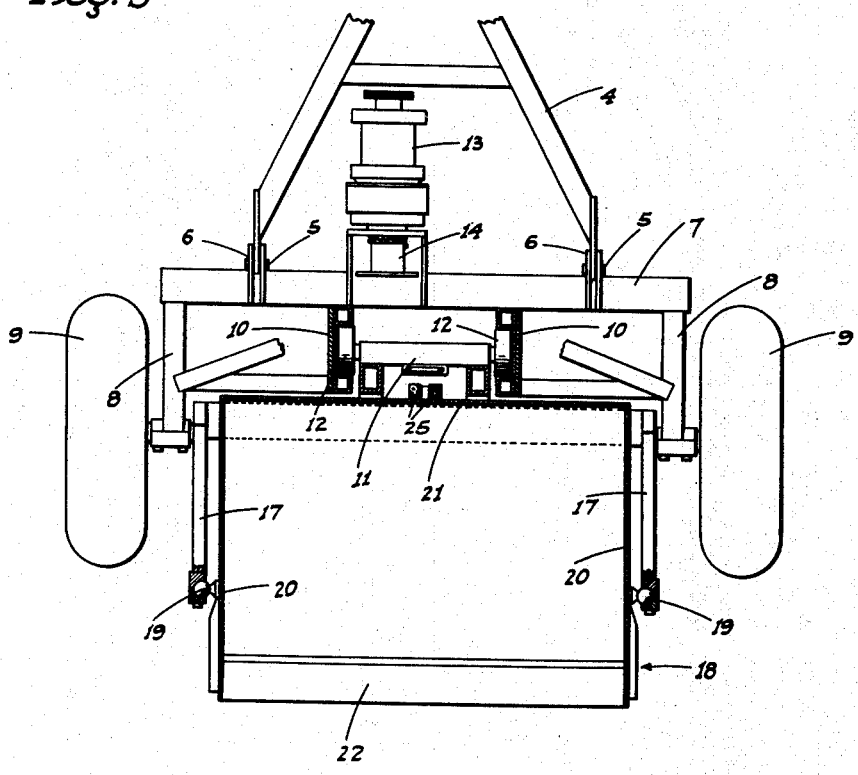
Figure 3 is a fragmentary sectional plan taken through the scoop and the adjacent frame mounted carriage.

When the above described implement is in use, the carriage 11 is run upwardly on the elevator frame 10 whereby the scoop elevates with a digging or scooping action, the digging position of said scoop being shown, for example, in Fig. 1. When it is desired that the scoop reach out further than normally, the tilt control unit 30 is actuated in a direction to tilt the elevator frame 10 rearwardly, as shown in Fig. 2. In this manner the reach of the implement is materially increased and at the same time such tilting action results in increased clearance below the scoop 18. This increase in clearance is enhanced by reason of the fact that when the elevator frame 10 is tilted in one direction, the wheels 9 relatively shift in an opposite direction by reason of the fact that the axis of pivots 5 is ahead of the wheel axis. This relative shifting of the wheels is for the purpose of providing greater clearance below the scoop 18, and is evident from a comparison of the relative positions of the scoop 18 and wheels 9 in Figs. 1 and 2.

After a load is taken into the scoop 18, the latter is rotated to its upwardly open carrying position and the implement then moves to the point of dumping. At such point the scoop 18 is rotated to its inverted dumping position and the load discharges therefrom. For loading trucks or the like, the truck moves under the scoop 18 so that when the latter dumps, the load falls into the truck body to be carried away.

The power scoop, as herein described is convenient and easy to use for the reason that it can be readily manipulated from place to place and additionally, adjustment of the scoop, both as to elevation and reach, are accomplished by the tractor operator merely by control of the described reversible electric power winches. The mounting and operation of the scoop is such that it can work in places inaccessible to known power shovels.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A power scoop comprising a wheel supported body, an upstanding elevator frame mounted on the body adjacent one end thereof, an elevator carriage guidably mounted on the elevator frame, power means operative to raise and lower the carriage, an outwardly projecting scoop, means mounting the scoop on the carriage for rotation about a horizontal transverse axis between digging, carrying, and dumping positions, said scoop including a digging blade on its normally lowermost edge, and other power means operative to rotate the scoop between said positions, selectively; the scoop having a back wall concentric to the axis thereof, and said other power means including a reversible winch unit having a drum, a pair of cable reaches extending in reverse relation from the drum, direction changing sheave means arranged so that said reaches lie circumferentially about said back wall in opposite directions, lapping each other, and being dead ended to the scoop at relatively widely spaced points circumferentially thereof.

2. A power scoop comprising a wheel supported body, an upstanding elevator frame mounted on the body adjacent one end thereof, an elevator carriage guidably mounted on the elevator frame, power means operative to raise and lower the carriage, an outwardly projecting scoop, means mounting the scoop on the carriage for rotation about a horizontal transverse axis between digging, carrying, and dumping positions, said scoop including a digging blade on its normally lowermost edge, and other power means operative to rotate the scoop between said positions, selectively; the scoop having a circumferentially curved back wall, and said other power means including a pair of cable reaches having portions disposed in oppositely extending, lapping relation circumferentially about said back wall and a reversible power winch unit connected in opposed, reversible relation to said reaches.

3. A power scoop comprising a wheel supported body, an upstanding elevator frame mounted on the body adjacent one end thereof, an elevator carriage guidably mounted on the elevator frame, power means operative to raise and lower the carriage, an outwardly projecting scoop, means mounting the scoop on the carriage for rotation about a horizontal transverse axis between digging, carrying, and dumping positions, said scoop including a digging blade on its normally lowermost edge, and other power means operative to rotate the scoop between said positions, selectively; the scoop having a circumferentially curved back wall, and said other power means including a pair of cable reaches extending substantially tangentially toward said curved wall but from opposite directions, and thence lapping and extending circumferentially about said wall to anchors on said wall at relatively widely spaced points circumferentially thereof.

4. A power scoop comprising a wheel supported body, an upstanding elevator frame mounted on the body adjacent one end thereof, an elevator carriage guidably mounted on the elevator frame, power means operative to raise and lower the carriage, transversely spaced brackets fixed on the carriage and projecting outwardly therefrom, a rotary scoop disposed between and journaled in connection with the brackets for rotation between digging, carrying, and dumping positions, and other power means operative to rotate the scoop between said positions selectively.

5. A power scoop comprising a wheel supported body, an upstanding elevator frame mounted on the body adjacent one end thereof, an elevator carriage guidably mounted on the elevator frame, power means operative to raise and lower the carriage, transversely spaced brackets fixed on the carriage and projecting outwardly therefrom, a rotary scoop disposed between and journaled in connection with the brackets for rotation between digging, carrying, and dumping positions, and other power means operative to rotate the scoop between said positions selectively; said other power means including a winch unit mounted on the carriage for travel therewith, and a cable system connected between the winch and said scoop.

6. A power scoop comprising a wheel supported body, an upstanding elevator frame mounted on the body adjacent one end thereof, an elevator carriage guidably mounted on the elevator frame, power means operative to raise and lower the carriage, transversely spaced brackets fixed on the carriage and projecting outwardly therefrom, a rotary scoop disposed between and journaled in connection with the brackets for rotation between digging, carrying, and dumping positions, and other power means operative to rotate the scoop between said positions selectively; said other power means including an electric winch unit mounted on the carriage for travel therewith, and a cable system connected between the winch and said scoop.

7. A power scoop comprising a wheel supported body, an upstanding elevator frame mounted on the body adjacent one end thereof, an elevator carriage guidably mounted on the elevator frame, power means operative to raise and lower the carriage, transversely spaced brackets fixed on the carriage and projecting outwardly therefrom, a rotary scoop disposed between and journaled in connection with the brackets for rotation between digging, carrying, and dumping positions, a winch unit mounted on the carriage for travel therewith, the winch unit having a cable drum vertically spaced relative to the transverse axis of the scoop, a direction changing sheave on the carriage vertically spaced from said axis in the opposite direction, the scoop having an arcuate back wall of substantially circumferential extent and said drum and sheave being substantially vertically alined in a plane adjacent said back wall, a cable having a pair of reaches leading in reverse relation from the drum, one reach extending to and about said direction changing sheave and both reaches thence engaging in reverse, lapping relation about said arcuate back wall, and means anchoring said reaches to the back wall at circumferentially and relative widely spaced points thereon.

8. A power scoop comprising a longitudinal body adapted at one end for connection to a tractor, a wheel truck adjacent the other end of the body including a transversely spaced pair of supporting wheels, means pivoting the truck to the body for relative pivotal movement in a longitudinal, vertical plane, an elevator frame fixed on and upstanding from the truck, the frame thus being tiltable in said plane, an elevator carriage on the elevator frame, power means to raise or lower the carriage, a longitudinally and outwardly projecting scoop mounted on the carriage, and power actuated tilt control means connected between the elevator frame and the body.

9. A power scoop comprising a longitudinal body adapted at one end for connection to a tractor, a wheel truck adjacent the other end of the body including a transversely spaced pair of supporting wheels, means pivoting the truck to the body for relative pivotal movement in a longitudinal, vertical plane, an elevator frame fixed on and upstanding from the truck, the frame thus being tiltable in said plane, an elevator carriage on the elevator frame, power means to raise or lower the carriage, a longitudinally and outwardly projecting scoop mounted on the carriage, and power actuated tilt control means connected between the elevator frame and the body; the axis of the truck pivoting means being substantially offset relative to the wheel axis in a direction opposite from the scoop.

10. A power scoop comprising a longitudinal body, a tractor connected to the body at one end, the tractor being steerable relative to the body, a wheel truck adjacent the other end of the body including a transversely spaced pair of supporting wheels, means pivoting the truck to the body for relative pivotal movement in a longitudinal, vertical plane, an elevator frame fixed on and upstanding from the truck, the frame thus being tiltable in said plane, an elevator carriage on the elevator frame, power means to raise or lower the carriage, a longitudinally and outwardly projecting scoop mounted on the carriage, and power actuated tilt control means connected between the elevator frame and the body.

11. A power scoop comprising a longitudinal body adapted at one end for connection to a tractor, a wheel truck adjacent the other end of the body, said wheel truck being generally U-shaped in plan and including transversely spaced legs carrying wheels adjacent their outer end, means pivoting the wheel truck to said other end of the body for pivotal movement in a longitudinal, vertical plane, the axis of said pivotal movement being adjacent the other ends of said legs, an elevator frame fixed on and upstanding from the truck, the frame thus being tiltable in said plane, an elevator carriage on the elevator frame, power means to raise or lower the carriage, a longitudinally and outwardly projecting scoop mounted on the carriage, and power actuated tilt control means connected between the elevator frame and the body.

ROBERT G. LE TOURNEAU.

REFERENCES CITED

The following references are of record in the file of this patent:

UNITED STATES PATENTS

| Number | Name | Date |
|---|---|---|
| 967,741 | Eastman | Aug. 16, 1910 |
| 1,236,112 | Scott | Aug. 7, 1917 |
| 1,792,772 | Sheen | Feb. 17, 1931 |
| 1,912,816 | Anthony | June 6, 1933 |
| 2,355,893 | Le Tourneau | Aug. 15, 1944 |
| 2,394,458 | Lull | Feb. 5, 1946 |
| 2,413,661 | Stokes | Dec. 31, 1946 |